(12) United States Patent
Le Paih (10) Patent No.: US 8,376,728 B2
(45) Date of Patent: Feb. 19, 2013

(54) DEVICE FOR MAKING TEXTURED PORTIONS OF FOOD PRODUCTS

(75) Inventor: Jacques Le Paih, Plumeliau (FR)

(73) Assignee: Stork Food Systems France, Baud (FR)

( * ) Notice: Subject to any disclaimer, the term of this patent is extended or adjusted under 35 U.S.C. 154(b) by 392 days.

(21) Appl. No.: 12/597,428

(22) PCT Filed: Apr. 24, 2008

(86) PCT No.: PCT/FR2008/000587
§ 371 (c)(1),
(2), (4) Date: Oct. 23, 2009

(87) PCT Pub. No.: WO2008/145860
PCT Pub. Date: Dec. 4, 2008

(65) Prior Publication Data
US 2010/0129513 A1 May 27, 2010

(30) Foreign Application Priority Data
Apr. 27, 2007 (FR) ..................... 07 03109

(51) Int. Cl.
*B26D 3/20* (2006.01)
*B26D 7/26* (2006.01)
(52) U.S. Cl. ........ 425/309; 425/292; 425/296; 425/301; 425/307; 425/312; 426/518
(58) Field of Classification Search .......... 425/292, 425/296, 297, 298, 300, 301, 304, 305.1, 425/307, 309, 310, 312, 96, 105, 235, 281, 425/511, 515; 426/414, 518; 452/141
See application file for complete search history.

(56) References Cited

U.S. PATENT DOCUMENTS

| 1,783,096 | A | * | 11/1930 | Pearce | 425/202 |
| 2,916,986 | A | * | 12/1959 | Lebovitz | 100/94 |
| 3,463,211 | A | * | 8/1969 | Holz | 83/404.3 |
| 3,789,750 | A | * | 2/1974 | Beck et al. | 99/536 |
| 3,956,518 | A | * | 5/1976 | Goldbach | 426/518 |
| 4,068,008 | A | * | 1/1978 | Orchard | 426/272 |
| 4,205,415 | A | * | 6/1980 | Orchard | 425/377 |
| 4,768,941 | A | * | 9/1988 | Wagner | 425/197 |

(Continued)

FOREIGN PATENT DOCUMENTS

| FR | 2476448 A | 8/1981 |
| FR | 2884287 A | 10/2006 |

(Continued)

*Primary Examiner* — Joseph Del Sole
*Assistant Examiner* — Seyed Masoud Malekzadeh
(74) *Attorney, Agent, or Firm* — Zarley Law Firm, P.L.C.

(57) ABSTRACT

This invention relates to a device for producing portions of food products in pieces, especially chunks of fresh meat, comprising at least one pump capable of outputting an approximately constant flow rate of food product in pieces, a tubular distributing pipe (2) connected to the delivery outlet of said pump, and comprising at least one delivery opening (22*a*, 22*b*), and cutting and shaping means (61) acting on the food product distributed by the outlet opening of the pipe to form portions (P1), said tubular pipe being equipped with a cutting system (3) comprising at least one cutting means, such as a flat oscillating blade (310*a*, 310*b*1 320*a*, 320*b*, 410), which traverses transversely from one side to the other of said main internal passageway in order to cut the food product into at least two layers and so produce textured portions (P1) of food products.

15 Claims, 4 Drawing Sheets

U.S. PATENT DOCUMENTS

| | | | |
|---|---|---|---|
| 4,771,664 A * | 9/1988 | Holz | 83/355 |
| 4,797,291 A | 1/1989 | Pierce et al. | |
| 4,839,120 A * | 6/1989 | Baba et al. | 264/102 |
| 4,988,276 A * | 1/1991 | Moeller | 425/290 |
| 5,104,667 A * | 4/1992 | Moeller | 426/144 |
| 5,264,232 A * | 11/1993 | Campbell | 426/503 |
| 5,356,652 A * | 10/1994 | Campbell | 426/503 |
| 5,514,397 A | 5/1996 | Shapiro | |
| 6,017,570 A * | 1/2000 | Gagliardi, Jr. | 426/513 |
| 6,026,742 A * | 2/2000 | Bei | 100/318 |
| 6,351,927 B1 * | 3/2002 | Righele et al. | 53/517 |
| 6,887,503 B1 * | 5/2005 | Rasmussen | 426/94 |
| 6,932,998 B2 * | 8/2005 | LaBruno et al. | 426/513 |
| 2004/0155129 A1 * | 8/2004 | Le Paih | 241/92 |
| 2004/0265456 A1 * | 12/2004 | Halverson et al. | 426/516 |
| 2005/0191402 A1 * | 9/2005 | Le Paih | 426/641 |
| 2008/0160128 A1 * | 7/2008 | Cohen et al. | 425/296 |

FOREIGN PATENT DOCUMENTS

| | | |
|---|---|---|
| GB | 2294380 A | 5/1996 |
| WO | 03/099021 A | 12/2003 |

* cited by examiner

DEVICE FOR MAKING TEXTURED PORTIONS OF FOOD PRODUCTS

BACKGROUND OF THE INVENTION

The present invention relates to a device for producing portions of food products and more particularly textured portions of food products from food products in pieces, especially patties of fresh meat in muscle.

There has been known from patent document EP 1397047 a device for producing portions of minced meat, such as minced steaks, comprising a mincer outputting a stream of minced meat, having an "angel's hair" type stringy structure created by the discharge grating of the mincer, an endless conveyor belt transporting the stream of minced meat at the output of the mincer and a cutting and shaping device comprising cutting means for cutting the stream of meat into portions, lateral shaping means acting simultaneously on each side of the stream of minced meat to shape the contours of the portions and vertical shaping means cooperating with said lateral shaping means to confer to said portions the desired thickness.

The mincer is associated to a flow-regulating member called pusher, typically comprising a pump, for example a pallet or piston type pump, supplied on the inlet by a hopper and whereof the discharge outlet is equipped with said mincer.

Patent document EP 1 509 089 describes an identical device for producing minced steaks filled with a filling. The mincer is equipped at the output with two distribution spouts for forming a lower stream of minced meat and an upper stream of minced meat respectively deposited on a main conveyor and a secondary conveyor. The filling is deposited on the lower stream of meat, and the upper stream of meat is then brought to overlap the lower stream of meat and the filling deposited on the latter to form a stream of filled minced meat, that then passes in the aforementioned cutting and shaping device.

Such devices are provided for producing portions from meat minced and extruded by the holes of the grating of a mincer. The final products obtained are textured into strings of minced meat oriented longitudinally, and thus have a stringy aspect.

The object of the present invention is to propose a device making it possible to obtain new products having a different texture.

SUMMARY OF THE INVENTION

To this end, the present invention proposes a device that makes it possible to produce end products having a textured aspect identical to that of the initial food product introduced into the pump, and particularly in the case of meat, keeping the fibrous aspect of the initial pieces of meat. The device according to the invention may be used for producing portions from any type of food product in pieces, such as meat in muscle, filleted fish, and vegetables in pieces such as carrots for example.

The object of the present invention is a device for producing portions of food products in pieces, especially patties of fresh meat in muscle, comprising at least one pump able to deliver at the output a substantially constant flow of food product in pieces, a tubular distribution duct connected to the discharge outlet of said pump to receive in the main internal passage thereof the food product exiting the pump, and comprising at least one distribution orifice, and cutting and shaping means acting on the food product distributed by the discharge orifice of the distribution duct to form portions of food products, characterized in that said distribution duct is equipped with a cutting system comprising at least one cutting means which transversally crossing on either side said main internal passage of the distribution duct, with a rectilinear cutting edge turned towards the flowing direction of the flow of food product in order to cut the food product in at least two layers, in such a way as to obtain textured portions of food product at the output of the shaping and cutting means.

According to the invention, the distribution system is equipped with at least one cutting means able to cut the flow of meat into at least two layers. The distribution duct is directly connected to the discharge outlet of the pump, without inserting a mincing system, so that, for food products in pieces, a new multi-layered, multi-stripped and/or in small pieces, textured end product is obtained whereof the external aspect corresponds to the texture of the initial food product in pieces. In the case of a food product in pieces such as meat in muscle, particularly turkey or chicken breasts for example or pieces of beef meat, the end product keeps the fibrous aspect of the initial meat. Said cutting means is a dynamic cutting means, such as for example a flat reciprocating blade-type blade coupled to a back-and-forth movement system, a circular rotary blade, a blade coupled with an ultrasonic generator, a laser beam and/or a water jet.

According to a feature, said pump is a rotary, piston-type pump comprising a stator defining a cylindrical cavity, a rotor or a barrel housed in said cylindrical cavity, able to be rotationally driven by a motor, said rotor comprising a set of circumferentially spaced bore holes, in which are mounted pistons, a mechanical cam cooperating with the pistons to cause, during the rotation of the barrel, a back and forth alternating movement of said pistons between a low position and a high position, a lid closing the cylindrical cavity, a supply orifice that comes into communication with at least one cylindrical chamber formed by a cylindrical bore hole of the barrel and its associated piston, and intended to be in communication with a hopper, a discharge outlet able to come simultaneously into communication with at least two consecutive cylindrical chambers.

According to another feature, in order to ensure a constant flow of food product and thus obtain a substantially constant weight portioning, said pump is such as defined in patent document FR 2 884 287, whereof the entire contents is incorporated here by reference, said pump comprising
 cylindrical chamber vacuuming means for filling the cylindrical chambers, said vacuuming means comprising at least one vacuuming channel exiting in the lower portion of each cylindrical chamber, said vacuuming means being able to vacuum via the bottom each cylindrical chamber by its vacuuming channel when the piston associated thereof is in low position,
 and/or cutting means comprising a blade arranged along the downstream edge of the supply orifice, to cut the pieces of product extending beyond the cylindrical chambers during their passage beyond the supply orifice.

According to another feature, the cutting system of the distribution duct comprises a first set of cutting means, arranged in a parallel manner one above another, for example horizontally, in order to cut the food product coming from the pump into several layers. The distance between two adjacent cutting means, for example two flat adjacent blades, is for example comprised between 1 and 20 mm, according to the desired end product, preferably between 2 and 7 mm.

According to another feature, the cutting system comprises a second set of cutting means arranged vertically in a parallel to each other, downstream from the first set of cutting means, in order to cut into strips each of the layers resulting from the first set of cutting means, the first set of cutting means and the second set of cutting means being preferably arranged perpendicularly to each other. For each set, the distance between two adjacent cutting means is comprised between 1 and 20 mm, preferably between 2 and 7 mm.

According to an embodiment, each cutting means of the cutting system comprises a flat reciprocating blade.

Advantageously, each set of blades comprises first reciprocating blades able to be displaced by a first movement system according to a back-and-forth movement, and second reciprocating blades, inserted between the first reciprocating blades, and displaced by a second movement system according to a back-and-forth movement opposed to that of the first reciprocating blades.

According to an embodiment, the cutting and shaping means are constituted by a cutting and shaping device of a type described in the aforementioned patent documents EP 1 397 047 and EP 1 509 089. Such a device includes a shaping conveying belt for receiving a stream of food product coming from the distribution duct, and along the latter, means for cutting said stream into portions, lateral shaping means acting simultaneously on each side of said stream in order to shape the contour of said portions, and vertical shaping means cooperating with said lateral shaping means in order to confer the desired thickness to said portions.

According to a feature, the distribution duct is provided with a cutting system comprising a cutting means, such as a flat horizontal reciprocating blade, arranged upstream from separating means for separating the main internal passage of the duct into two secondary passages, so as to form an upper stream of food product and a lower stream of food product, said device comprising, preferably, a main transport belt in order to receive the lower stream of food product, a secondary transport belt, advancing continuously, arranged above the main transport belt in order to receive the upper stream and possibly, filling depositing means able to deposit a filling, preferably laterally, on the lower stream, said secondary transport belt being then able to transport and deposit said upper stream on said lower stream and the filling.

According to another embodiment, the cutting and shaping means include a knife, preferably rotary, able to slice the food product exiting the distribution duct, a transport belt to recover the slices formed by said knife, and preferably, along this transport belt, lateral shaping means to shape the contour of said portions, and vertical shaping means to confer the desired thickness to said portions.

According to alternative embodiments, the device comprises several pumps, for example two pumps, the distribution duct being connected to the discharge outlet of each pump to receive in its main internal passage the food product exiting each pump, the pumps being able to be used to deliver various food products.

The object of the present invention also relates to a method for producing portions of food product in pieces, especially patties of fresh meat in muscle, characterized in that it comprises a step a) of forming a substantially constant flow of food product in pieces in a distribution duct, a step b) of cutting in said distribution duct of the food product into at least two layers, and a step c) of cutting and shaping of the food product at the output of the distribution duct to form portions of food product having the texture of the initial food product.

According to a feature, at step a), the food product is cut into a plurality of continuous superimposed horizontal layers, for example of a thickness of 1 to 20 mm, preferably of 2 to 7 mm, each horizontal layer of food product can also be cut into a plurality of continuous strips, from 1 to 20 mm of width, preferably 2 to 7 mm of width, that is, strips having cross-sections of 1 to 400 mm$^2$, preferably of 4 to about 50 mm$^2$.

According to a feature, the food product at the output of the distribution duct has the form of at least one continuous stream, the step c) comprising the cutting and the shaping of said stream into portions of food products in superimposed layers or in longitudinal strips. According to an embodiment, the food product at the output of the distribution duct has the form of a lower continuous stream and an upper continuous stream brought to overlap the lower stream, the method further comprising a step consisting in depositing a filling on the lower stream before it is covered by the upper stream, in order to form a main continuous filled stream, the step c) comprising the cutting and the shaping of said main stream into portions of food products filled with a filling.

According to another embodiment, at step c), the food product at the output of the distribution duct is cut into slices in order to form, after shaping, portions of food product in transversal strips or in small pieces of food product.

The object of the invention also relates to end products obtained from the method and the producing device defined here above.

The invention will be better understood, and other objects, details, features and advantages will become more apparent from the following detailed explanatory description of currently-preferred particular embodiments of the invention, with reference to the accompanying schematic drawings in which:

BRIEF DESCRIPTION OF THE DRAWINGS

FIGS. 11, 12 and 13 are respectively schematic perspective top and cross-sectional longitudinal views, according to plane XII-XII, of a device according to a second embodiment of the invention, for producing patties of meat thinly sliced into small pieces; and, FIG. 14 is a perspective view of a device according to an alternative embodiment of the second embodiment of FIGS. 11 to 13 for producing patties of meat thinly sliced into transversal strips.

DETAILED DESCRIPTION OF THE PREFERRED EMBODIMENTS

Figure 1:
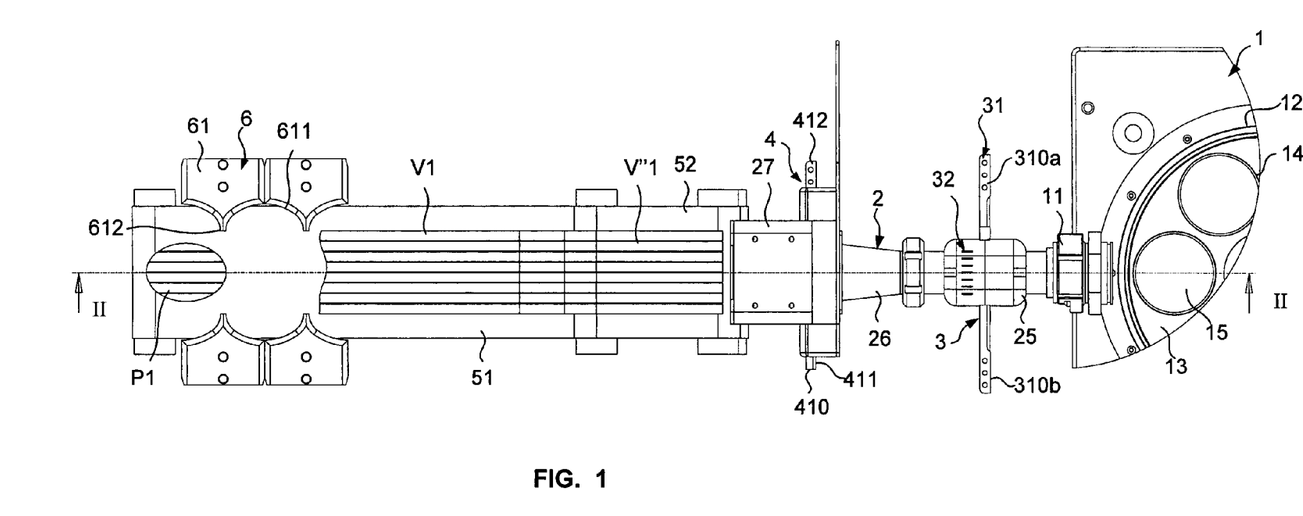
FIG. 1 shows a top schematic view of a device for producing portions according to a first embodiment of the invention, for producing filled patties of meat thinly sliced into longitudinal strips, in which the piston pump and the cutting and shaping device are only partially shown.
Figure 2:
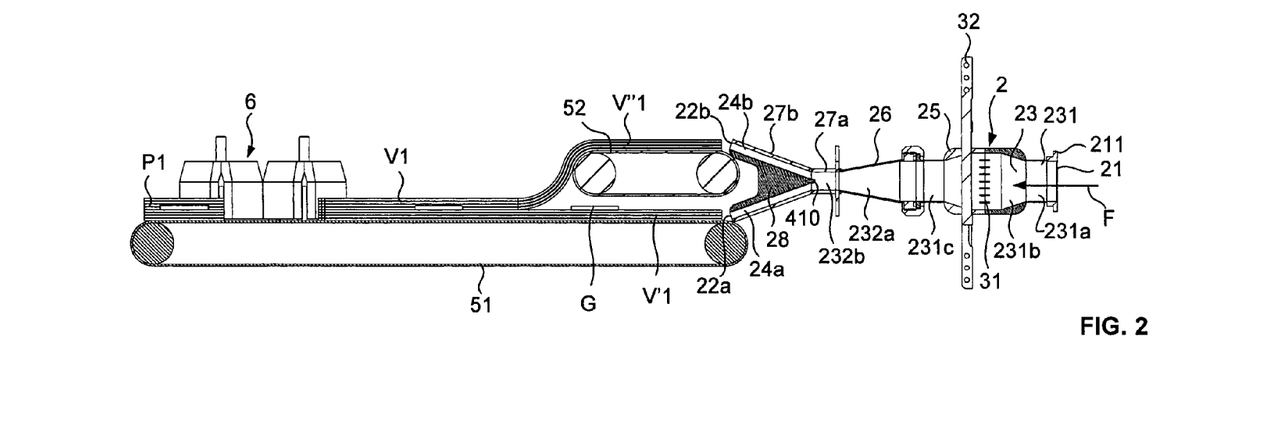
FIG. 2 is a longitudinal cross-sectional view according to the cutting plan II-II of the device in FIG. 1, the pump being omitted.
Figures 3, 4:
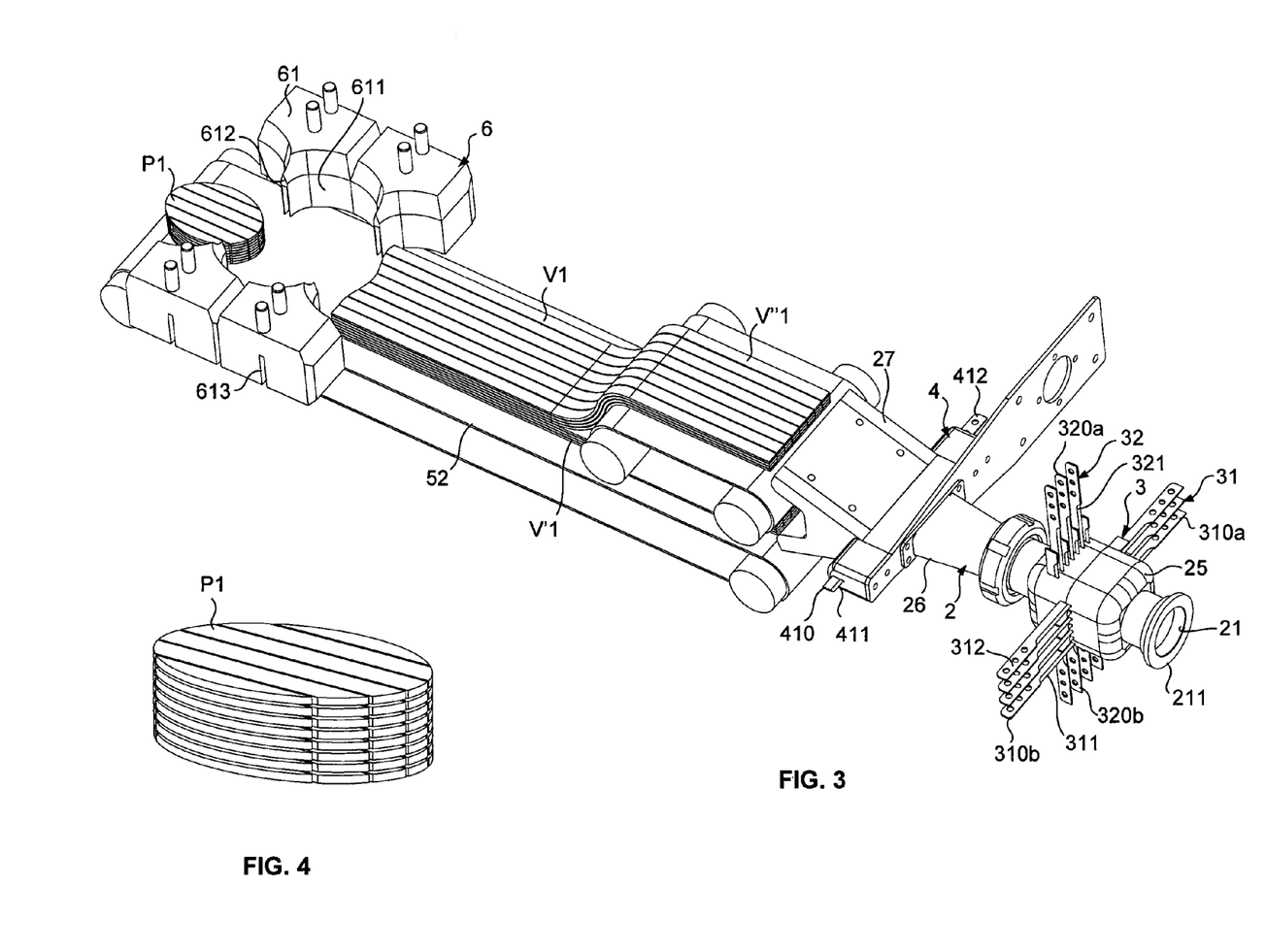
FIG. 3 is a perspective view of the device in FIG. 1, the pump being omitted.
FIG. 4 is a schematic perspective view of an end product obtained with an identical device to that shown in FIGS. 1 to 3.

First considering FIGS. 1 to 3, they schematically show a device for producing portions of food products according to a first embodiment especially intended to produce patties of meat thinly sliced into strips or sticks and filled with an internal filling, from pieces of non-minced meat.

The device comprises a pump 1 schematically and partially shown on FIG. 1, provided at its discharge outlet 11 with a distribution duct 2. According to FIG. 2, said distribution duct comprises an inlet orifice 21 through which the duct is connected to the discharge outlet of said pump for receiving in its main internal passage 23 the pieces of meat delivered by the pump, this main passage subdividing into two secondary passages 24a and 24b defining downstream into two distributing orifices 22a, 22b, vertically shifted from each other to form a lower stream of meat V'1 and an upper stream of meat V"1.

The pump is a piston pump of the type described in patent document FR 2 884 287, comprising a stator 12 defining a cylindrical cavity; a rotor or barrel 13 housed in said cylindrical cavity, able to be rotationally driven by a motor, said rotor comprising a set of circumferentially spaced bore holes 14, wherein pistons 15 are mounted; a mechanical cam cooperating with the pistons to cause, during the rotation of the barrel, a back and forth alternating movement of said pistons between a low position and a high position, a lid (not shown) closing the cylindrical cavity; a supply orifice that comes into communication with at least one cylindrical chamber formed by a cylindrical bore hole of the barrel and its associated piston, and intended to be in communication with a supply hopper wherein the pieces of meat are placed; and a discharge orifice that is connected at the discharge outlet 11 of the pump and that is able to come simultaneously into communication with at least two consecutive cylindrical chambers. In order to obtain a substantially homogenous filling of the cylindrical chambers, with no voids, and thus obtain a substantially constant flow of food products in pieces at the output of the pump, the pump comprises, such as described in detail in the aforementioned patent document, vacuuming means of the cylindrical chambers for carrying out an aspiration via the bottom in the cylindrical chambers during their filling, and cutting means at the supply orifice of the pump to cut those large pieces of meat extending beyond the cylindrical chambers during their passage beyond the supply orifice.

With particular reference to FIG. 3, the distribution duct is provided with a first cutting system 3 comprising a first set 31 of flat reciprocating blades 310a, 310b, arranged horizontally, in parallel above one another for cutting the pieces of meat coming from the pump into horizontal layers. These horizontal reciprocating blades include substantially rectilinear cutting edges 311, turned towards the flowing direction of the meat flow F (FIG. 2) in the duct, and substantially arranged according to a same transversal plan. Each blade crosses the duct throughout at its main passage, and is slidingly mounted on the duct by passing through two opposed slits of the duct wall, arranged symmetrically on either side of the longitudinal vertical plane II-II. Each blade comprises an assembling end 312 to assemble it to a movement system (not shown) able to displace the blade according to a back-and-forth movement. The blades slide substantially sealingly in the slits of the duct. This first set 31 comprises first blades 310a assembled on a same side of the duct by their assembling end 312 to a first movement system (not shown), and second blades 310b coming to interpose between the first blades, and assembled from their assembling end to a second movement system. This mounting of blades with two movement systems makes it possible, by an appropriate control thereof, to obtain a back-and-forth movement of the first blades opposed to that of the second blades, and thus to limit or suppress at least in part the transversal loads applied by the reciprocating blades on the pieces of meat when it is being cut.

The first cutting system 3 comprises a second set 32 of reciprocating blades 320a, 320b, arranged perpendicularly and downstream from the first set 31 of horizontal reciprocating blades, in order to cut the pieces of meat into vertical layers, or more precisely to cut into several horizontal strips or slivers, each of the horizontal superimposed layers of meat resulting from the first set 31. The vertical flat blades 320a, 320b of this second set are vertically arranged, in parallel next to each other, with substantially rectilinear cutting edges 321 turned towards the flowing direction of the meat flow F and substantially arranged according to a same transversal plan. Each vertical reciprocating blade crosses de duct throughout by passing through two opposing slits of the duct wall, arranged symmetrically on either side of the longitudinal horizontal symmetrical plane of the duct. This second set 32 also comprises first blades 320a assembled from their assembling end 312 to a movement system to be displaced according to a back and forth alternating movement opposed to that of the second blades 320b, interposed between the first blades and assembled to a second movement system. In the illustrated example, the first set comprises 7 horizontal reciprocating blades, and the second set comprises 7 vertical reciprocating blades.

With reference to FIG. 2, these two sets of blades are arranged at a so-called cutting portion 231 from the main passage, including an upstream part 231a and a downstream part 231c whereof the transversal circular sections substantially correspond to those of the discharge orifice of the pump, and a central part 231b crossed by the blades, whereof the circular transversal section is higher than those of the upstream and downstream parts, in order to take into account the encumbrance of the blades, and prevent a compression of the meat when it passes by the blades.

Downstream from the cutting portion, the main passage extends by a so-called shaping portion 232a,b comprising a first part 232a whereof the section passes progressively from upstream to downstream from a circular section to a rectangular section and a second part 232b of constant rectangular section corresponding to the desired section of the main stream V1. Downstream from this second part 232b, the main passage is divided into two secondary passages 24a and 24b of identical rectangular cross-section.

As illustrated on FIGS. 1 to 3, the distribution duct 23 is formed of three tubular pieces assembled to each other: a first piece 25, provided with a skirt 211 for its mounting on the pump, which forms the cutting portion 231a-c of the main passage; a second piece 26 forming the first part 232a of the shaping portion of the main passage; and a third piece 27, divergent-shaped, comprising a first part 27a of constant rectangular cross-section, defining the second part 232b of the shaping portion of the main passage, this first part 27a extended by a second part 27b, whereof the rectangular cross-section increases upstream-wise to downstream-wise, and wherein is mounted a corner-shaped piece 28, of longitudinal cross-section in an isosceles triangle, to form the two secondary passages 24a, 24b between the main surfaces of the corner-shaped piece 28 and the wall of the second part 27b of the third piece.

The distribution duct is provided with a second cutting system 4 comprising one single flat horizontal reciprocating blade 410 crossing throughout the distribution duct at part 232b of constant rectangular cross-section of the shaping portion to ensure the separation of the meat flow of the main passage into two identical meat flows towards the secondary passages. The reciprocating blade 410 passes through two lateral slits of piece 27 and is arranged along the ridge of the corner-shaped piece 28. Its cutting edge 411 is positioned just upstream from this ridge, and is turned towards the flowing direction of the meat flow, or such as illustrated on FIG. 2, is slidingly mounted in a groove of the corner-shaped piece 28 and forms the ridge of said corner-shaped piece. This cutting blade is assembled by its assembling end 412 to a back-and-forth movement system.

The two streams V'1 and V"1 exiting from the distribution orifices 24a and 24b are each formed of superimposed layers of continuous slivers. The lower stream V' is deposited on the upper strand of a main transport belt 51; whereas the second stream is received on the upper strand of a secondary transport belt 52, arranged above the main transport belt 51, parallel to the latter, both belts being substantially isovelocity driven.

A filling dispenser (not shown) is arranged downstream from the distribution duct to deposit the filling at regular intervals on the lower stream V'1, in the form of relatively liquid topping doses, or in the form of slices G as shown in the drawings. The filling dispenser is for example of the type described in patent document EP 1 509 089, and comprises a notched conveyor wheel to laterally bring the filling between the two transport belts 51 and 52. The length of the secondary transport belt 52 is less than that of the main transport belt 51, and the upper stream V"1 is deposited at the output of this secondary transport belt 52 on the lower stream V'1 and the slices of filling G having just been deposited, to form the main continuous stream of slivered and filled meat V1.

The main stream is transferred as it is formed towards a cutting and shaping device 6, shown partially and schematically on the drawings, operating synchronically with the main transport belt 51, on the one hand to process the stream V1 as it is formed, and on the other hand, to cut into portions substantially in the middle of intervals between the successive slices of filling.

The cutting and shaping device 6 is of the type described in the aforementioned patent documents EP 1 397 047 and EP 1 509 089, comprising a transport belt called shaping conveying belt, intended to make the main stream V1 advance while being formed, which, in practice, is advantageously the main transport belt 51 whereon the main stream V1 is constituted. The device comprises along the latter, downstream from the secondary transport belt 52, means for cutting said stream into portions, lateral shaping means simultaneously acting on each side of said stream to shape the contour of said portions, and vertical shaping means cooperating with said lateral shaping means to confer the desired thickness to said portions. The lateral shaping means associated to the belt 52 comprise indented lateral shaping blocks 61 that advance symmetrically by sliding on each side and immediately above it. The blocks are adjacently mounted one after another in a same endless loop arrangement mounted above the belt 52. From upstream to downstream on the belt, blocks 7 get progressively closer facing each other until they touch to form therewith, by their indents 611, shaping cells, then move apart again. Each of said lateral shaping blocks exhibit two indents on each side of a central tip 612, so that the shaping cells are each formed between two consecutive pairs of lateral facing shaping blocks. Only two consecutive pairs of shaping blocks are shown on the drawings. The blocks comprise in their lower wall slits 613 whereby they are slidingly mounted on transversal rails which form the cutting means. A synchronism is provided between the filling dispenser D and the advancement of rails 42, so that the sectioning of the stream V is properly performed in the interval between two slices of filling. The vertical shaping means are constituted of pressing elements that cooperate with the lateral shaping blocks to come and close from the top said cells when they are formed, then descend therein in two times, first to carry out the desired compacting of portions, then to transfer them positively to a lower level on a transport belt following belt 52, and ensuring their loading into packaging trays.

FIG. 4 shows in a very schematic manner an end product P1 obtained with a similar device to that described with reference to FIGS. 1 to 3, but comprising a first set of 7 horizontal reciprocating blades and a second set of 5 vertical reciprocating blades. The end product has a fibrous structure of superimposed layers of longitudinally arranged strips. Of course, the illustration in FIG. 4 is very schematic, the strips being in contact with each other and being formed from one or several pieces of meat. In comparison with a standard minced steak, the end product retains the fibrous texture of the initial pieces of meat.

Figures 5, 6, 8, 9:
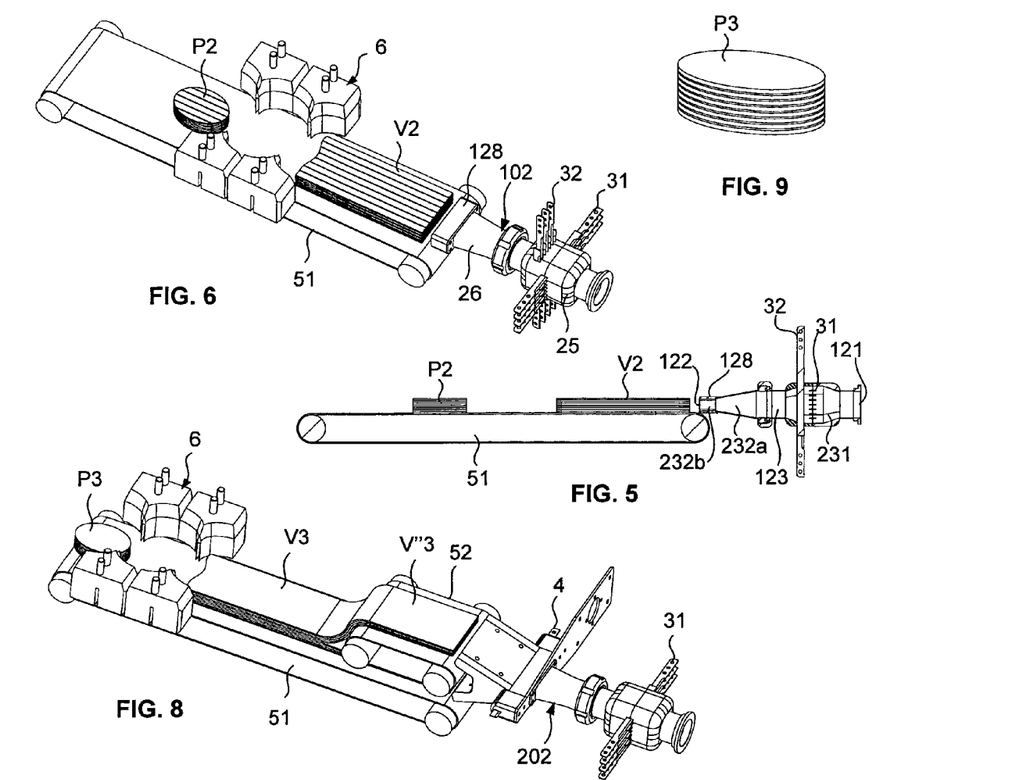
FIGS. 5 and 6 are respectively longitudinal cross-sectional and perspective views similar to FIGS. 2 and 3, of a first alternative embodiment of the device of FIGS. 1 to 3, for producing unfilled patties of meat thinly sliced into strips.
FIGS. 7 and 8 are respectively longitudinal cross-sectional and perspective views similar to FIGS. 2 and 3, of a second alternative embodiment of the device of FIGS. 1 to 3, for producing filled patties of meat in superimposed layers.
FIG. 9 is a schematic perspective view of a filled multi-layered patty obtained with the device shown in FIGS. 7 and 8.

FIGS. 5 and 6 show an alternative embodiment of the device shown in FIGS. 1 to 3 for producing an end product P2 that is different from product P1 by the fact that it does not comprise any filling. The distribution duct 102 comprises an inlet orifice 121 and one single distribution orifice 122 for forming one single stream V2. The main internal passage 123 is not subdivided into two secondary passages, it comprises, as previously, a cutting portion 231, formed by a first piece 25, at which are mounted the two sets of reciprocating blades 31 and 32, and a shaping portion whereof the first part 232a is formed as previously by the second piece 26 and whereof the second part 232b is constituted this time of one piece 128 of constant rectangular transversal cross-section forming a simple distribution spout with a unique distribution orifice 122. The device comprises one single main transport belt 51 for receiving the stream V2, and along which is positioned the cutting and shaping device 6.

Figure 7:
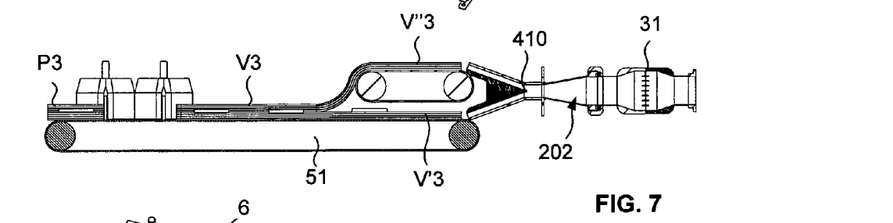

FIGS. 7 and 8 show an alternative embodiment of the device shown in FIGS. 1 to 3 for producing a multi-layered filled end product P3. The distribution duct 202 is different from that of FIGS. 1 to 3 by the fact that it is provided with a first cutting system comprising only one first set 31 of horizontal reciprocating blades, so as to form at the output a filled stream V3 of meat in superimposed layers, from a lower stream V'3 and from an upper stream of meat V"3. According to FIG. 9, the textured end product P3 obtained is formed of superimposed layers of meat.

Figure 10:
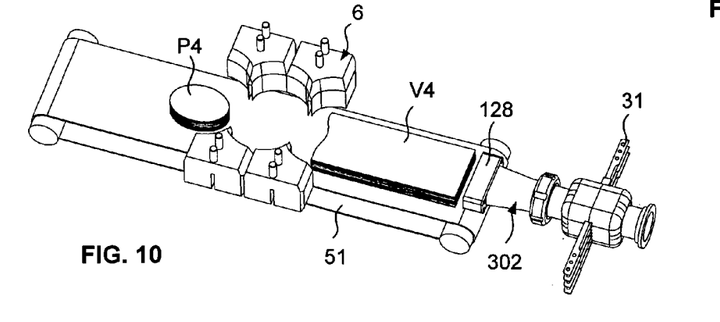
FIG. 10 is a perspective view of a third alternative embodiment of the device in FIGS. 1 to 3, for producing unfilled patties of meat in superimposed layers.

FIG. 10 shows another alternative embodiment that is different from that of FIGS. 5 and 6 by the fact that the distribution duct 302 is provided with a cutting system 3 that does not comprise a set of vertical reciprocating blades, the end products P4 obtained from stream V4 being of multilayered-type, like product P3, but with no filling.

According to another alternative embodiment not shown, the distribution duct is formed of the aforementioned piece 26 that is directly connected to the pump, and of the dual distribution spout system, formed by aforementioned pieces 27 and 28, provided with a second cutting system 4. The reciprocating blade thus serves to cut into two layers, the meat delivered by the pump, the two layers being separated so that each one passes into a secondary passage. By way of example, this device may be used to form portions of turkey or chicken breasts, filled with filling, entire breasts being directly loaded in the hopper supplying the pump.

Figures 11, 14:
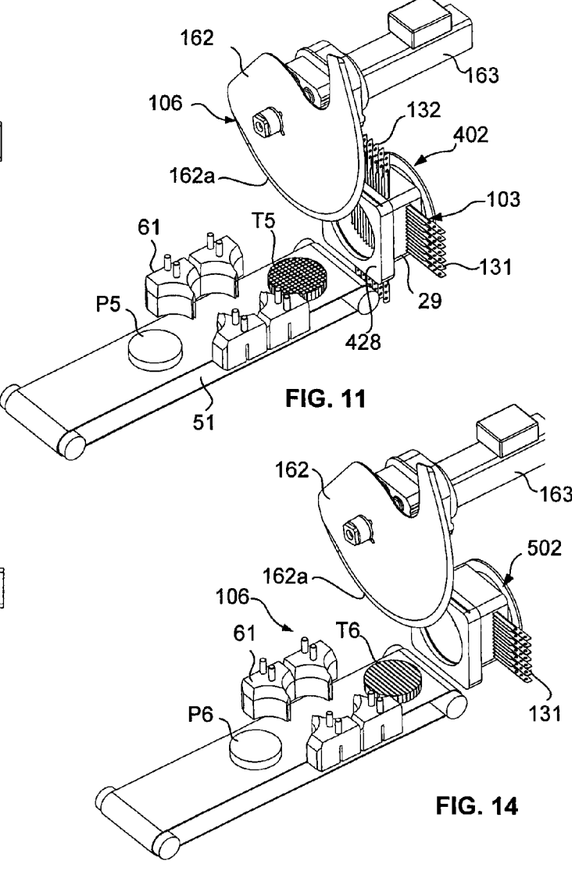
Figure 12:
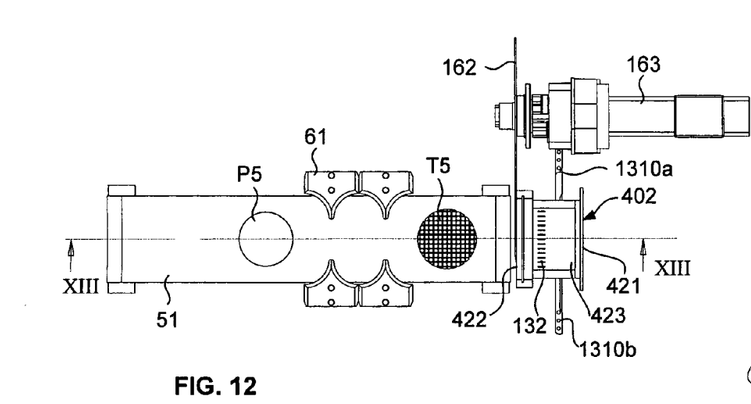
Figure 13:
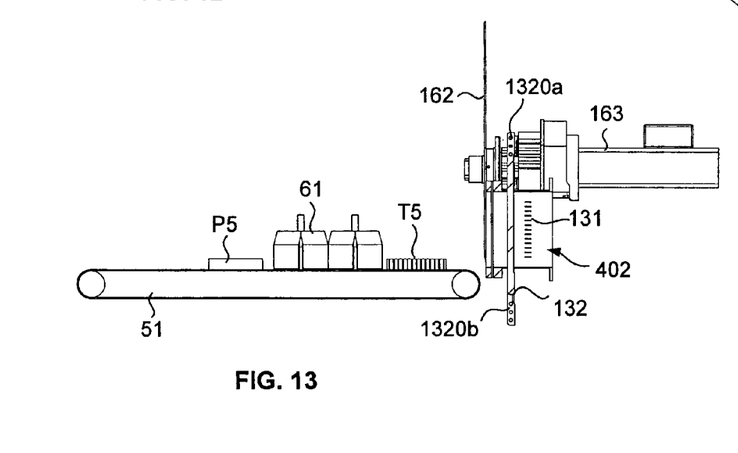

FIGS. 11 to 13 show a second embodiment wherein the distribution duct 402 is formed of a tubular piece 29 directly mounted at the output of the piston pump (not shown) and comprising a main internal passageway 423 of constant internal transversal cross-section corresponding to the cross-section of the output of the pump, with an inlet orifice 421 and a distribution orifice 422. The duct is equipped with a cutting system 103 formed of a first set 131 of horizontal reciprocating blades 1310a, 13010b and of a second set 132 of vertical reciprocating blades 1320a, 1320b, arranged downstream of the first set to cut the meat into rectangular or square slivers or strips, arranged in superimposed layers. These two sets 131, 132 are similar to those 31, 32 described before, with first and second blades displaced in opposing parallel back-and-forth movements. Each set 131, 132 comprises for example 13 blades.

As a cutting means, the shaping and cutting device 106 comprises a rotary knife 162 including a flat blade with a curved cutting edge 162a, that is arranged perpendicularly to the longitudinal axis of the duct and parallely to the front side 428 of the duct that serves as cutting surface plate. The blade is rotationally driven by a motor 163 around an axis parallel to the axis of the duct so as to displace the curved cutting edge 162a of the blade in front of the discharge orifice 422, to cut vertically in slices T5 the meat exiting from the distribution duct. The knife thus makes it possible to cut into small pieces the continuous strips formed at the output of the cutting system 103. The device comprises a transport belt 52 on the upper strand from which are recovered the slices T5 of small pieces of meat. The FIGS. 11 to 13 schematically show the slice at the output of the duct on the transport belt, with pieces of meat all oriented vertically. In practice, in the case of portions obtained from pieces of raw meat, and according to the number of blades and thus according to the size of the strips, the slice T5 that has just been cut and that has fallen on the transport belt, is in the form of a heap of small pieces of thinly sliced meat oriented in all directions. Lateral and vertical shaping means 61 identical to those previously described are arranged along the belt 52 to shape the contour of substantially circular portions P5, and to provide them with the desired thickness.

FIG. 14 shows an alternative embodiment wherein the distribution duct 502 only comprises a first set of horizontal reciprocating blades 131, to obtain at the output of the duct, slices T6 of meat in strips oriented mainly transversally, then circular portions P6 at the output of the shaping means.

Although the invention has been described in relation with several particular embodiments, it is to be understood that it is in no way limited thereto and that it includes all the technical equivalents of the means described as well as their combinations should these fall within the scope of the invention.

What is claimed is:
1. A device for producing portions of food products in pieces, the device comprising
a pump to deliver at an output a substantially constant flow of food product,
a tubular distribution duct connected to the output of said pump in order to receive in an internal passage therein the food product exiting the pump, the tubular distribution duct having a discharge orifice and being provided with a cutting system comprising a cutting means transversally crossing on either side of said internal passage of the tubular distribution duct in order to cut the food product into at least two layers, and
cutting and shaping means acting on the food product provided by the discharge orifice in order to form portions of food products,
wherein said cutting means comprises first flat reciprocating blades able to be displaced by a first movement system in a back-and-forth movement, and second flat reciprocating blades inserted between the first flat reciprocating blades, and displaced by a second movement system in a back-and-forth movement opposed to that of the first flat reciprocating blades to or suppress at least in part the transversal loads applied by reciprocating blades on the pieces of food product when the food product is being cut.

2. Device according to claim 1, characterised in that the cutting system comprises a first set of cutting means, arranged in a parallel manner one above one another, in order to cut the food product coming from the pump into several layers.

3. Device according to claim 2, characterised in that the cutting system comprises a second set of cutting means arranged vertically in parallel next to each other, downstream of the first set of cutting means, in order to cut into strips each of the layers resulting from the first set of cutting means.

4. Device according to claim 1, characterised in that the cutting and shaping means include a shaping conveying belt in order to receive a stream of food product coming from the distribution duct, and therealong, a rotary knife including a flat blade having a curved cutting edge for cutting said stream into portions, lateral shaping means acting simultaneously of each side of said stream in order to shape the contour of said portions, and vertical shaping means cooperating with said lateral shaping means in order to confer the desired thickness to said portions.

5. Device according to claim 1, characterised in that the distribution duct is provided with a cutting system comprising a cutting means arranged upstream of separating means for separating the internal passage of the distribution duct into two secondary passages, so as to form an upper stream of food product and a lower stream of food product, said device comprising a first transporting belt in order to receive the lower stream of food product, a second transporting belt, advancing continuously, arranged above the first transporting belt in order to receive the upper stream, and filling depositing means to deposit a filling on the lower stream, said second transporting belt being able to transport and deposit said upper stream on said lower stream and the filling.

6. Device according to claim 1, characterised in that the cutting and shaping means include a knife able to slice the food product exiting the distribution duct, a transport belt to recover slices formed by said knife, and along said transport belt, lateral shaping means to shape the contour of said portions and vertical shaping means to confer the desired thickness to said portions.

7. Device according to claim 1, characterised in that said pump has a rotary piston, and comprises a stator defining a cylindrical cavity, a rotor housed in said cylindrical cavity, able to be driven in rotation by a motor, said rotor comprising a set of bore holes circumferentially spaced, wherein are mounted pistons, a mechanical cam cooperating with the pistons in order to provoke during the rotation of the drum a back-and-forth alternating movement of said pistons between a low position and a high position, a lid closing the cylindrical cavity, a supply orifice that comes into communication with at least one cylindrical chamber formed by a cylindrical hole of the barrel and the piston associated thereof, and intended to be in communication with a hopper, a discharge outlet able to come simultaneously into communication with at least two consecutive cylindrical chambers.

8. Device according to claim 7, characterised in that said pump further comprises vacuuming means for vacuuming cylindrical chambers for the filling thereof, said vacuuming means comprising at least one vacuuming channel exiting in the lower portion of each cylindrical chamber, said vacuuming means being able to vacuum via the bottom each cylindrical chamber via the vacuuming channel thereof when the piston associated thereof is in low position.

9. Device according to claim 7, characterised in that said pump further comprises cutting means, comprising a blade arranged along the downstream edge of the supply orifice, in order to cut the pieces of product extending beyond the cylindrical chambers during the passage thereof beyond the supply orifice.

10. A device for producing portions of a food product in pieces, the device comprising:
- a tubular distribution duct receiving therein a substantially constant flow of food product fed at a first end by delivering means, the tubular distribution duct being ended horizontally by a discharge orifice, at a second end, and being provided with a cutting system comprising a reciprocating cutting means transversally crossing an internal passage of the tubular distribution duct in order to cut the food product,
- cutting and shaping means acting on the food product outside the tubular distribution duct in order to form portions of the food product, the cutting and shaping means including a knife able to cut the food product, a transport belt to recover the cuts formed by said knife, and, along said transport belt, lateral and vertical shaping means to shape the contour of said portions,
- wherein the knife comprises a rotating blade which is disposed outside the tubular distribution duct, at the location of said discharge orifice, to cut transversally and vertically in slices the food product exiting the discharge orifice.

11. The device of claim 10, wherein the delivering means comprises a pump feeding the tubular distribution duct with the food product in pieces, at said first end.

12. A device for producing portions of a food product in pieces, the device comprising:
- a tubular distribution duct receiving therein a substantially constant flow of food product fed by delivering means, the tubular distribution duct having an horizontal discharge orifice at an output end, and being provided with a cutting system comprising a reciprocating cutting means transversally crossing an internal passage of the tubular distribution duct in order to cut the food product,
- cutting and shaping means acting on the food product outside the tubular distribution duct in order to form portions of the food product, the cutting and shaping means including a knife able to cut the food product, a transport belt to recover the cuts formed by said knife, and, along said transport belt, lateral and vertical shaping means to shape the contour of said portions,
- wherein the knife comprises a flat blade having a curved cutting edge to cut vertically in slices the food product at said output end.

13. The device of claim 12, wherein the delivering means comprises a pump feeding the tubular distribution duct with the food product in pieces, at an input end of the tubular distribution duct.

14. A device for producing portions of a food product in pieces, the device comprising:
- a tubular distribution duct receiving therein a substantially constant flow of food product fed by delivering means, the tubular distribution duct having an axis and a discharge orifice on said axis ending the tubular distribution duct, and being provided with a cutting system comprising a reciprocating cutting means transversally crossing an internal passage of the tubular distribution duct in order to cut the food product,
- cutting and shaping means acting on the food product outside the tubular distribution duct in order to form portions of the food product, the cutting and shaping means including a knife able to cut the food product, a transport belt to recover the cuts formed by said knife, and, along said transport belt, lateral shaping means to shape the contour of said portions and vertical shaping means to confer a desired thickness to said portions,
- wherein the knife comprises a blade which rotates on itself around an axis parallel to the discharge orifice axis, to cut in slices the food product exiting the discharge orifice.

15. The device of claim 14, wherein the delivering means comprises a pump feeding the tubular distribution duct with the food product in pieces, at an input end of the tubular distribution duct.

* * * * *